United States Patent
Mercier

[15] 3,675,896
[45] July 11, 1972

[54] VALVE INCLUDING RESILIENT SEAT WASHER WITH ABUTTING RIGID ANNULAR WASHER

[72] Inventor: Jacques H. Mercier, 49 rue de Naples, Paris, France

[22] Filed: May 21, 1970

[21] Appl. No.: 39,441

[30] Foreign Application Priority Data

May 28, 1969 France..................................6917305

[52] U.S. Cl..............................251/321, 251/364, 251/361
[51] Int. Cl..........................................................F16k 1/34
[58] Field of Search..................251/360, 361, 362, 364, 321, 251/358

[56] References Cited

UNITED STATES PATENTS

| | | |
|---|---|---|
| 2,348,548 | 5/1944 | Koehler..................................251/364 |
| 2,481,460 | 9/1949 | Williams................................251/361 |
| 2,073,112 | 3/1937 | Lindinger...........................251/361 X |
| 2,927,767 | 3/1960 | Ray......................................251/360 X |
| 2,571,433 | 10/1951 | Fine et al..............................251/361 X |

Primary Examiner—Arnold Rosenthal
Attorney—Arthur B. Colvin

[57] ABSTRACT

This invention relates to a valve for fluid under pressure which may be a gas or liquid, the valve comprising a fluid passageway having a resilient annular seat encompassing the passageway with the valve member cooperating with said seat to control said passageway, said valve member being urged to closed position against said seat both by the fluid pressure and by associated resilient means and providing a highly effective seal at all pressures, both high and extremely low, the valve member including a stem, the end of which is designed to be pushed to open the valve.

5 Claims, 5 Drawing Figures

INVENTOR
JACQUES H. MERCIER
By ...
ATTORNEY

VALVE INCLUDING RESILIENT SEAT WASHER WITH ABUTTING RIGID ANNULAR WASHER

This invention relates to an improvement over the invention disclosed in copending applications SER. Nos. 734,388, filed June 4, 1968, now U.S. Pat. No. 3,549,121 and 814,539, filed Apr. 9, 1969, now U.S. Pat. No. 3,544,065.

As conducive to an understanding of the invention, it is noted that where a pressure vessel is used in systems in which the pressure varies over a wide range, it is essential that the charging valve incorporated into the pressure vessel be capable of providing a dependable seal throughout such range of pressures.

Where the charging valve is of the type comprising a fluid passageway having a resilient annular seat encompassing the passageway, which annular seat is retained in fixed position by the abutment of two rigid parts which are screwed together for example, and a valve member has an outstanding annular rim which is moved against the annular seat to seal the passageway, if the transverse abutting surfaces of said rigid parts are not exactly perpendicular to the axis of the valve, when the rigid parts are screwed together, they may move laterally thereby deforming the resilient member retained therebetween and preventing proper sealing action.

It is accordingly among the objects of the invention to provide a charging valve that is simple in construction and has but few parts that may be readily fabricated at low cost, which may readily be assembled without likelihood of improper deformation or off center movement of the sealing member of the valve and which will be effective to prevent leakage over a wide pressure range.

According to the invention, the valve comprises two fixed parts which are screwed together to form an assembly, a washer of resilient material defining an annular seat between the parts and being securely retained in position. A valve member is provided movable with respect to said seat and having along one of its faces directed toward said seat, a peripheral circular rib or rim which is of material harder than that of the resilient washer and which is designed to be forced against said resilient washer to effect a seal, means being provided to limit the degree of abutment of said annular rib into the resilient washer. A stem or rod rigid with the valve member extends axially thereof through an axial bore, the diameter of the bore being greater than that of said stem to provide clearance therebetween. The valve member is forced against the resilient washer both by resilient means and by the fluid under pressure in the valve, the valve member being adapted to be opened by force exerted against said rod or stem.

In a preferred embodiment of the invention, means are provided to reinforce the resilient washer to prevent displacement thereof and malfunctioning of the valve.

The resilient washer thus serves both as a permanent gasket or packing with respect to the atmosphere as well as with respect to the two parts of the valve member and also serves as a gasket against which the valve member may abut for closure of the valve. Thus, the washer provides an excellent seal for both high and low pressures and even for very low pressure and in such case dependable closing action is accomplished by the resilient means associated with the valve member.

It is essential in valves of the above type that the resilient washer be accurately located without risk of accidental displacement both in assembly and in use and it is for this that in the preferred embodiment supporting means are provided for the resilient washer.

More particularly, the supporting means, according to the invention, comprises an additional washer which is associated with the washer of resilient material and which is concentric therewith.

The supporting washer is of material which is more rigid than that of the resilient washer. Thus, the supporting washer can be made of natural or synthetic rubber which is harder than the rubber or similar material from which the resilient washer is made. The supporting washer can be made of Nylon or suitable metal.

According to one embodiment of the invention, the supporting washer may be of angular shape in cross section providing a cylindrical flange which encompasses the resilient washer and a plane flange which is applied axially against the resilient washer. Preferably, the supporting washer, which is preassembled onto the resilient washer, is bonded thereto. This arrangement facilitates both initial assembly and replacement of the resilient washer.

According to another embodiment of the invention, the plane flange is positioned in a corresponding groove formed in one of the faces of the resilient washer.

More particularly, according to the invention, the cylindrical flange may be the same height as the thickness of the resilient washer. However, the cylindrical flange may be of lesser height in which case a recess is provided in the face of the resilient washer to accommodate the supporting member.

It is within the scope of the invention to provide a supporting washer which is U-shaped in cross section having a cylindrical flange and two opposing plane flanges which straddle the periphery of the resilient washer.

In the accompanying drawings in which are shown one or more of various possible embodiments of the several features of the invention;

Figure 3:

FIG. 3 relates to another variation in which the supporting washer has a height less than that of the sealing washer.

Figure 1:
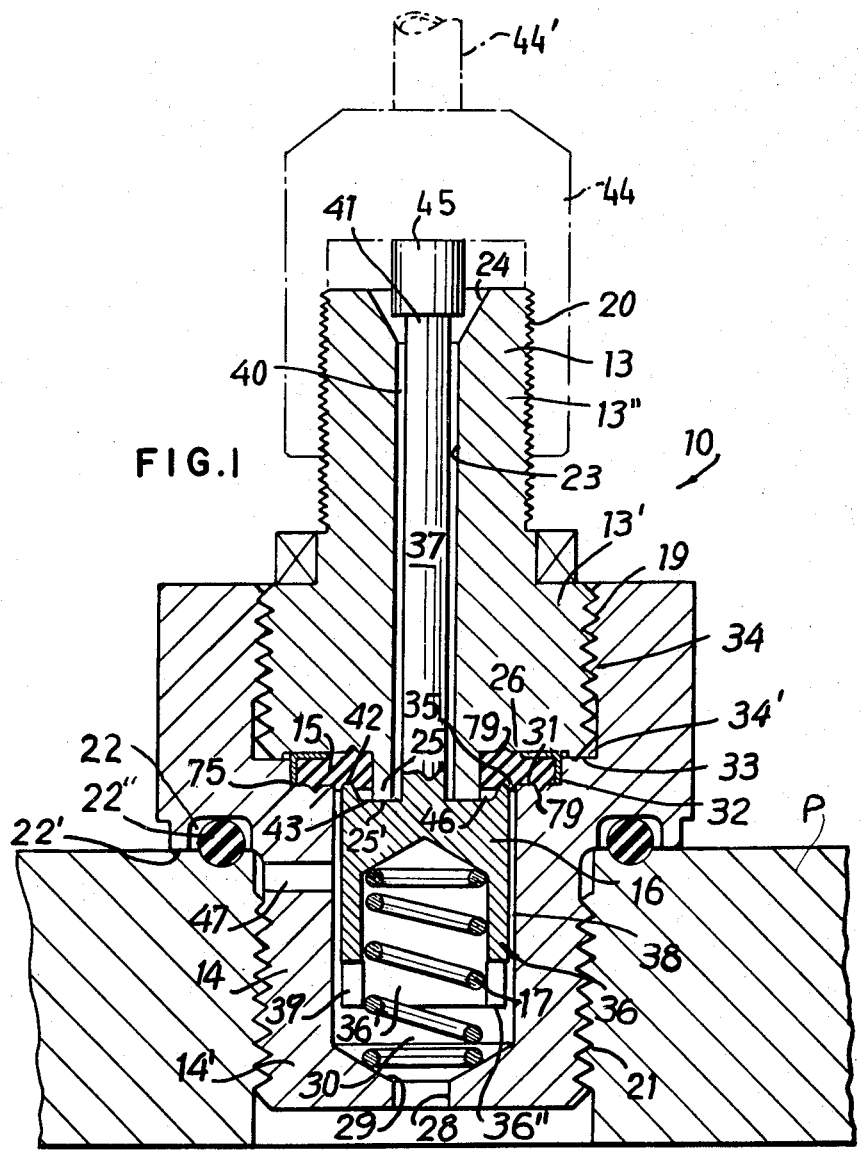
FIG. 1 is a longitudinal sectional view of a valve according to the invention in which the supporting washer has an L-shaped section and has the same height as the sealing washer.
Figure 4:
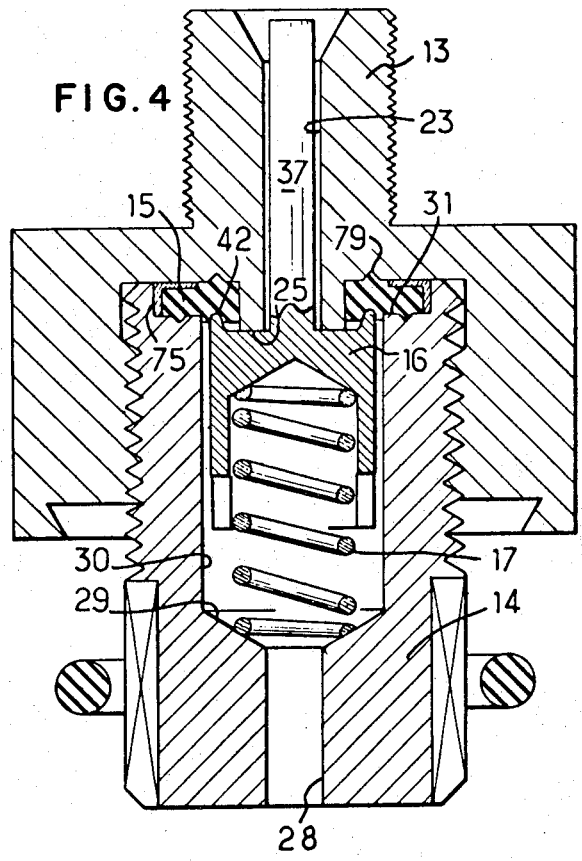
Figure 5:
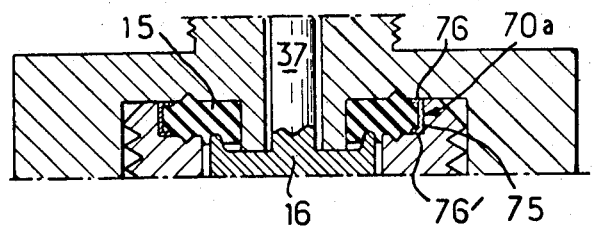

FIG. 4 is a view similar to FIG. 1, but in which the screwing of the two fixed parts is modified, the upper part screwing around the lower part instead of screwing inside the latter, and FIG. 5 is a detail sectional view similar to FIG. 4, but in which the supporting washer has a U-shaped section.

Figure 2:
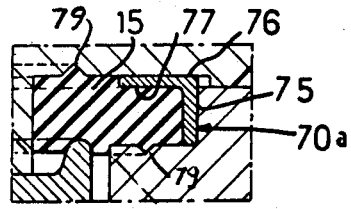
FIG. 2 is a detail sectional view on a larger scale showing, in particular, the sealing washer and the supporting washer.

Referring now to the drawings, in the embodiment shown in FIGS. 1 and 2, the valve 10 comprises a base portion 14 having an axial bore therethrough of enlarged diameter at its outer end as at 34. End 34 is internally threaded as at 19 to receive the correspondingly threaded enlarged diameter end portion 13' of a plug 13, the latter having a reduced diameter stem 13'' which is externally threaded as at 20.

The plug 13 has an axial bore 23 therethrough with a conical recess 24 at its outer end. The inner end of the axial bore 23 extending through the end portion 13' has a cylindrical boss 25 which projects from the inner face 26 of the end portion 13'.

The bore in the base portion 14 is of reduced diameter as at 32 defining an annular shoulder 33 between the reduced portion 32 and the enlarged diameter threaded portion 34. The end portion 13' is threaded into portion 34 so that the periphery 34' of the face 26 will abut against shoulder 33.

The bore of said base portion 14 has an additional reduced diameter portion 30 defining a cavity having an annular shoulder 31 at its outer end and having a conical seating surface 29 at its inner end which tapers inwardly to a smaller diameter port 28 at the inner end of the axial bore in the base portion 14.

As is clearly shown in FIG. 1, the length of the cylindrical boss 25 is greater than the length of the reduced diameter portion 32 of the axial bore in the body portion 14 so that the end 25' of said cylindrical boss extends beyond the annular shoulder 31 when the plug 13 is screwed in the base portion 14.

Positioned on shoulder 31 is the outer periphery of a washer 15 of resilient material, said washer defining a resilient seat. As shown in FIG. 1, the washer encompasses the cylindrical boss 25, the end 25' of which protrudes beyond the washer.

The washer 15 which may be of rubber or similar material, is normally of thickness greater than the length of reduced portion 32 and less than the length of the cylindrical boss 25.

As shown in FIGS. 1 and 2, a supporting washer 70a is provided. The washer 70a is angular in cross section having a cylindrical flange 75 which encompasses the resilient washer 15 and at least one plane flange 76 which is applied axially against the washer 15 adjacent its outer periphery.

The washer 70a is preassembled on washer 15 and is secured thereto by its two flanges 75, 76. As shown in FIG. 2, the plane flange 76 is positioned in a corresponding groove 77 formed on the periphery of the face of the washer 15 which is adjacent the floor 26 of plug 13.

It is to be noted that, as shown in FIG. 1, as the periphery 34' of plug 13 abuts against annular shoulder 33 encompassing the set of washers 15 and 70a, this will limit the compression of the resilient washer 15 between plug 13 and base 14 by providing a slight compression of the cylindrical flange 75 which, as shown in FIGS. 1 and 2, is preferably of height equal to the thickness of washer 15.

With the washer thus mounted, the portion of the inner surface of the washer extending inwardly of the annular shoulder 31 will be substantially co-planar with said shoulder 31 and will present an uncovered sealing zone 35 which extends between the cylindrical boss 25 and the cylindrical wall of the cavity 30, to define a valve seat.

As shown in FIGS. 1 and 2, it is to be noted that the surface of washer 15 positioned on shoulder 31 and the surface of washer 15 adjacent the inner periphery thereof, which is not covered by the plane flange 76, are embedded in groves 79 formed in plug 13 and base 14. This arrangement tends to retain the washer 15 in position between said elements.

Positioned in the reduced diameter portion 30 is a cylindrical cup-shaped valve member 36, the outer surface of which is considerably spaced from the wall surface of bore portion 30 as at 38.

The end wall or floor 16 of the cup-shaped valve member 36 has an axial stem 37 extending therefrom through the bore 23 of plug 13. The stem 37 is of much smaller diameter than bore 23 to define a fluid passageway 40 therebetween.

The end of the wall of the cup-shaped valve member 36 has a plurality of notches 39 therethrough defining fluid passageways.

The inner end of the base 14 is of reduced diameter as at 14' and is externally threaded as at 21. The reduced diameter end 14' defines an annular shoulder 22' which has an annular groove 22 therein in which a resilient "O" ring 22" may be positioned, and a passageway 47 extends through reduced diameter portion 14' adjacent the annular shoulder 22'.

The outer surface 43 of the floor 16 of valve 36 has a peripheral rim 42 which is normally urged against the sealing portion 35 of washer 15 by means of a coil spring 17, positioned in the recess 36' of the cup-shaped valve member 36 and compressed between opposed surfaces of the valve member and the seating surface 29.

Since the valve member 36 is essentially floating, there is no problem of alignment and an effective seal will be provided so long as the annular rim 42 engages washer 15. The abutment of the outer surface 43 of the floor of the valve member against the end 25' of the cylindrical boss 25 will prevent cutting of the washer 15 by the rim 42.

It is to be noted that the end 41 of the stem 37 extends into the conical recess 24 when the valve member is in closed position as shown in FIG. 1.

It is to be further noted that the clearances 40 and 38 and the port 28 form a passageway for the fluid charged through the inlet 24. This passageway is normally closed as at 46 when the annular rim 42 is urged against the surface 35 of washer 15 by both the force of spring 17 and the fluid pressure in the pressure vessel P being charged as shown in FIG. 1. The passageway is open when the annular rim 42 is moved away from the sealing portion 35 of washer 15 when the stem 37 is moved inwardly in the manner now to be described.

To effect opening of the valve, in order to charge or discharge the pressure vessel, as the case may be, a suitable coupling 44, shown diagrammatically in FIG. 1, is screwed onto the reduced stem 13".

The coupling 44 has an internal axial hub 45 designed to react against the end 41 of the stem 37 to move the latter inwardly. Thus, when the coupling 44 is screwed in place, the stem 37 will be moved inwardly to move the annular rim 42 of the valve member 36 away from its seat 35, to provide communication between port 28 of the base 14 and the conduit 44' connected to the coupling.

In the event that when the valve member 36 is moved to open position, the sudden rush of fluid under pressure should cause the valve member 36 to move away from its seat rapidly, so that the end 41 of the stem 37 moves away from the hub 45, by reason of the fact that the rim 36" of the cup-shaped valve member would abut against the surface 29, excessive compression of coil spring 17 would be prevented to insure long life of said coil spring.

The purpose of port 47 is to insure that as the valve unit is unscrewed for removal there will be relief of fluid under pressure from the pressure vessel P before the valve unit is completely unscrewed to prevent blowout of the latter.

In the embodiment shown in FIG. 3, the cylindrical flange 75 of supporting member 70a is of height less than the resilient washer 15. In this embodiment when the parts 13 and 14 are screwed together, flange 75 is subjected to little or no compression which it would be if it was the full height of the washer 15 as shown in FIG. 1. As a result, it may be desired to form the washer 70a of FIG. 3 so that it is of greater thickness than the washer 70a shown in FIG. 1 for example.

In the embodiment shown in FIG. 4, the arrangement is similar to that described with respect to FIG. 1 but the two parts 13 and 14 are screwed together in a different manner. Thus, in FIG. 4 the part 13 fits over the part 14 and encompasses the latter, while in FIG. 1 the part 13 is screwed into part 14.

In the embodiment shown in FIG. 5 which is similar to that of FIG. 4, the washer 70a is U-shaped in cross section, having a cylindrical flange 75 and two opposing plane flanges 76 and 76'. The U-shaped washer shown in FIG. 5 can of course be used with the valve shown in the other embodiments.

With the supporting washer shown in FIGS. 1 to 5 there is assurance that the resilient washer will be accurately located both in assembly and in use thereby preventing malfunctioning of the valve.

Having thus described my invention, what I claim as new and desire to secure by Letters Patent of the United States is:

1. A valve for controlling flow of fluid under pressure, said valve comprising a pair of relatively movable engaging parts having a passageway therethrough for such fluid, an annular washer of resilient material coaxial with said passageway and defining a valve seat, the surface of said resilient washer opposed to the surface thereof defining said valve seat heaving a peripheral annular groove, an annular washer of rigid material coaxial with said first washer, said rigid annular washer being angular in cross section having a cylindrical flange which encompasses the first washer and abuts thereagainst and at least one plane flange which is applied axially against a surface of said first washer, said plane flange of said rigid washer being positioned in said annular groove, a valve member associated with said seat defined by said first annular washer and movable thereagainst to stop flow through said passageway, resilient means reacting against said valve member normally to retain the latter against said seat, said valve member having an axial stem extending through said passageway and movable in direction opposed to the direction of the force exerted by said resilient means to move the valve member away from said seat.

2. The combination set forth in claim 1 in which said rigid washer defines a support for said resilient washer and is preassembled on the latter being secured thereto both by said cylindrical flange and by said plane flange.

3. The combination set forth in claim 1 in which said cylindrical flange is of height substantially the same as the thickness of the resilient washer.

4. The combination set forth in claim 1 in which said rigid washer is substantially L-shaped in cross section having a single plane flange.

5. A valve for controlling flow of fluid under pressure, comprising a base having an axial bore therethrough internally threaded at one end, a plug having an axial bore therethrough, said plug having an externally threaded portion coacting with the internally threaded bore in said base for releasable mount of said plug, said base bore having reduced diameter portions defining a cavity having a port at one end and an annular shoulder at its other end, said plug having a cylindrical hollow boss coaxial with the plug bore, a resilient washer encompassing said boss and having its outer periphery seated on said shoulder, the portion of said resilient washer extending inwardly of said seated outer periphery defining a valve seat, an annular washer of rigid material coaxial with said resilient washer, said rigid washer being angular in cross section having a cylindrical flange which encompasses the resilient washer and abuts thereagainst and is seated on said shoulder and at least one plane flange which is applied axially against a surface of said resilient washer, an additional annular shoulder in said base bore between said first annular shoulder and the internally threaded portion of said base bore, said washers being normally of thickness greater than the length of the wall portions between said shoulders, whereby when said plug is screwed into the threaded portion of said base bore into abutment with said additional annular shoulder, the peripheral portion of said resilient washer and said cylindrical flange resting on said first annular shoulder will be compressed to form a dependable seal, said boss protruding beyond the surface of said washer, a valve member movable in said cavity and having an axial stem extending outwardly from one end thereof through the bore in said plug, said end having and annular rim coaxial with said stem, resilient means in said cavity urging said valve member in direction to move said rim against the valve seat portion of said resilient washer to define a seal to close off connection between said plug bore and said cavity, said boss limiting the movement of said valve member.

* * * * *